(12) United States Patent
Okushiro

(10) Patent No.: US 12,159,449 B2
(45) Date of Patent: Dec. 3, 2024

(54) IMAGE RECOGNITION DEVICE, IMAGE RECOGNITION SYSTEM, IMAGE RECOGNITION METHOD, AND NON-TRANSITRY COMPUTER-READABLE RECORDING MEDIUM

(71) Applicant: JVCKENWOOD Corporation, Yokohama (JP)

(72) Inventor: Hidetaka Okushiro, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 494 days.

(21) Appl. No.: 17/666,613

(22) Filed: Feb. 8, 2022

(65) Prior Publication Data

US 2022/0157050 A1 May 19, 2022

Related U.S. Application Data

(63) Continuation of application No. PCT/JP2020/035350, filed on Sep. 17, 2020.

(30) Foreign Application Priority Data

Sep. 25, 2019 (JP) ................. 2019-174630

(51) Int. Cl.
*G06K 9/00* (2022.01)
*G06T 5/50* (2006.01)
(Continued)

(52) U.S. Cl.
CPC ............ *G06V 10/7747* (2022.01); *G06T 5/50* (2013.01); *G06V 10/764* (2022.01); *G06V 10/82* (2022.01);
(Continued)

(58) Field of Classification Search
CPC ............ H04N 23/70–76; G06T 3/4038; G06T 2207/20212; G06T 2207/20221;
(Continued)

(56) References Cited

U.S. PATENT DOCUMENTS 10,761,182 B2 * 9/2020 Tchilian .................. G06T 5/70
11,062,436 B2 * 7/2021 Pekkucuksen .......... G06T 7/254
(Continued)

FOREIGN PATENT DOCUMENTS

JP  2012-003326  1/2012
JP  2019-003565  1/2019

OTHER PUBLICATIONS

International Search Report and Written Opinion for International Application No. PCT/JP2020/035350 mailed on Nov. 24, 2020, 9 pages.

*Primary Examiner* — Atiba O Fitzpatrick
(74) *Attorney, Agent, or Firm* — Amin, Turocy & Watson, LLP

(57) ABSTRACT

An image recognition device includes an image acquisition unit, a composite image generating unit, and a pattern information generating unit. The image acquisition unit is configured to acquire a plurality of pieces of image data captured in accordance with a passage of time. The composite image generating unit is configured to generate composite image data in which the plurality of pieces of image data are arranged. The pattern information generating unit is configured to generate pattern information that is information on a change pattern of each of the pieces of image data in accordance with the passage of time by acquiring a CNN model that is a trained convolutional neural network model and inputting input data that is based on the composite image
(Continued)

data to the acquired CNN model. The pattern information indicates whether flicker occurs in an image of the image data.

19 Claims, 9 Drawing Sheets

(51) Int. Cl.
*G06V 10/764* (2022.01)
*G06V 10/774* (2022.01)
*G06V 10/82* (2022.01)
*H04N 23/745* (2023.01)

(52) U.S. Cl.
CPC . *H04N 23/745* (2023.01); *G06T 2207/10016* (2013.01); *G06T 2207/20081* (2013.01); *G06T 2207/20084* (2013.01); *G06T 2207/20212* (2013.01)

(58) Field of Classification Search
CPC ........... G06T 2207/20081; G06T 2207/20084; G06V 10/454; G06V 10/70; G06V 10/82; G06V 10/774–7796; G06N 3/0464; G06N 3/02–126; G06N 20/00–20; G06K 9/6256; G06K 9/6257; G06K 9/6259; G06F 18/214–2155; G06F 7/023; G06F 40/16

See application file for complete search history.

(56) References Cited

U.S. PATENT DOCUMENTS

| | | | |
|---|---|---|---|
| 2008/0309791 A1* | 12/2008 | Nishiwaki | H04N 23/70 348/241 |
| 2011/0305384 A1 | 12/2011 | Aoyama et al. | |
| 2012/0320232 A1* | 12/2012 | Trumbo | H04N 23/73 348/226.1 |
| 2017/0272737 A1* | 9/2017 | Jacobs | G02B 30/23 |
| 2018/0376084 A1* | 12/2018 | Ulaganathan | H04N 23/951 |
| 2019/0318497 A1* | 10/2019 | Zhao | A61B 5/1128 |
| 2020/0034658 A1* | 1/2020 | Chung | G06F 18/28 |
| 2020/0160043 A1* | 5/2020 | Yamada | G06V 40/20 |
| 2020/0174094 A1* | 6/2020 | Tchilian | G01S 5/163 |
| 2021/0035325 A1* | 2/2021 | Yang | G06T 7/73 |
| 2021/0209730 A1* | 7/2021 | Liu | G06T 3/4007 |
| 2021/0224951 A1* | 7/2021 | Ahn | G06T 3/4007 |

\* cited by examiner

| LABEL | LABEL TYPE | LEARNING PURPOSE COMPOSITE IMAGE DATA |
|---|---|---|
| L1 | WITH FLICKER | Qa1, , , , |

| LABEL | LABEL TYPE | LEARNING PURPOSE COMPOSITE IMAGE DATA |
|---|---|---|
| LABEL L1 | IMAGE CAPTURING CONDITION M1 | Qa1, , , |
| LABEL L2 | IMAGE CAPTURING CONDITION M2 | Qa2, , , |
| LABEL L3 | IMAGE CAPTURING CONDITION M3 | Qa3, , , |

IMAGE RECOGNITION DEVICE, IMAGE RECOGNITION SYSTEM, IMAGE RECOGNITION METHOD, AND NON-TRANSITRY COMPUTER-READABLE RECORDING MEDIUM

CROSS-REFERENCE TO RELATED APPLICATIONS

This application is a Continuation of PCT International Application No. PCT/JP2020/035350 filed on Sep. 17, 2020 which claims the benefit of priority from Japanese Patent Application No. 2019-174630 filed on Sep. 25, 2019, the entire contents of both of which are incorporated herein by reference.

BACKGROUND

The present invention relates to an image recognition device, an image recognition system, an image recognition method, and a non-transitory computer-readable recording medium.

In recent years, a convolutional neural network (CNN) is sometimes used for image recognition. For example, Japanese Laid-open Patent Publication No. 2019-3565 describes performing image recognition on postures of persons by using the CNN.

However, in a CNN, it is difficult to recognize a change pattern of each of images in accordance with a passage of time because connectivity is performed only toward a subsequent layer. If a recurrent neural network (RNN) or a long short term memory (LSTM) is used, it is possible to recognize a passage of time; however, a recursive operation is needed, so that a load of arithmetic processing is increased. Therefore, there is a need to appropriately recognize the change pattern of each of the images in accordance with a passage of time while reducing the load of arithmetic processing.

SUMMARY

An image recognition device according to an aspect of the present embodiment includes an image acquisition unit, a composite image generating unit, and a pattern information generating unit. The image acquisition unit is configured to acquire a plurality of pieces of image data captured in accordance with a passage of time. The composite image generating unit is configured to generate composite image data in which the plurality of pieces of image data are arranged. The pattern information generating unit is configured to generate pattern information that is information on a change pattern of each of the pieces of image data in accordance with the passage of time by acquiring a CNN model that is a trained convolutional neural network model and inputting input data that is based on the composite image data to the acquired CNN model. The pattern information indicates whether flicker occurs in an image of the image data.

An image recognition system according to an aspect of the present embodiment includes the above-described image recognition device and a learning unit configured to generate the CNN model. The learning unit generates the CNN model by acquiring learning purpose composite image data in which a plurality of pieces of learning purpose image data are arranged, and assigning a label to the learning purpose composite image data. A change pattern of each of the pieces of learning purpose image data in accordance with a passage of time is known.

An image recognition method according to an aspect of the present embodiment includes: acquiring a plurality of pieces of image data captured in accordance with a passage of time; generating composite image data in which the plurality of pieces of image data are arranged; and generating pattern information that is information on a change pattern of each of the pieces of image data in accordance with the passage of time by acquiring a CNN model that is a trained convolutional neural network model and inputting input data that is based on the composite image data to the acquired CNN model. The pattern information indicates whether flicker occurs in an image of the image data.

A non-transitory computer-readable recording medium according to an aspect of the present embodiment contains a computer program. The computer program causes a computer to execute: acquiring a plurality of pieces of image data captured in accordance with a passage of time; generating composite image data in which the plurality of pieces of image data are arranged; and generating pattern information that is information on a change pattern of each of the pieces of image data in accordance with the passage of time by acquiring a CNN model that is a trained convolutional neural network model and inputting input data that is based on the composite image data to the acquired CNN model. The pattern information indicates whether flicker occurs in an image of the image data.

The above and other objects, features, advantages and technical and industrial significance of this invention will be better understood by reading the following detailed description of presently preferred embodiments of the invention, when considered in connection with the accompanying drawings.

DETAILED DESCRIPTION

Embodiments according to the present invention will be described in detail below with reference to the accompanying drawings. The present invention is not limited to the embodiments described below.

First Embodiment

Figure 1:
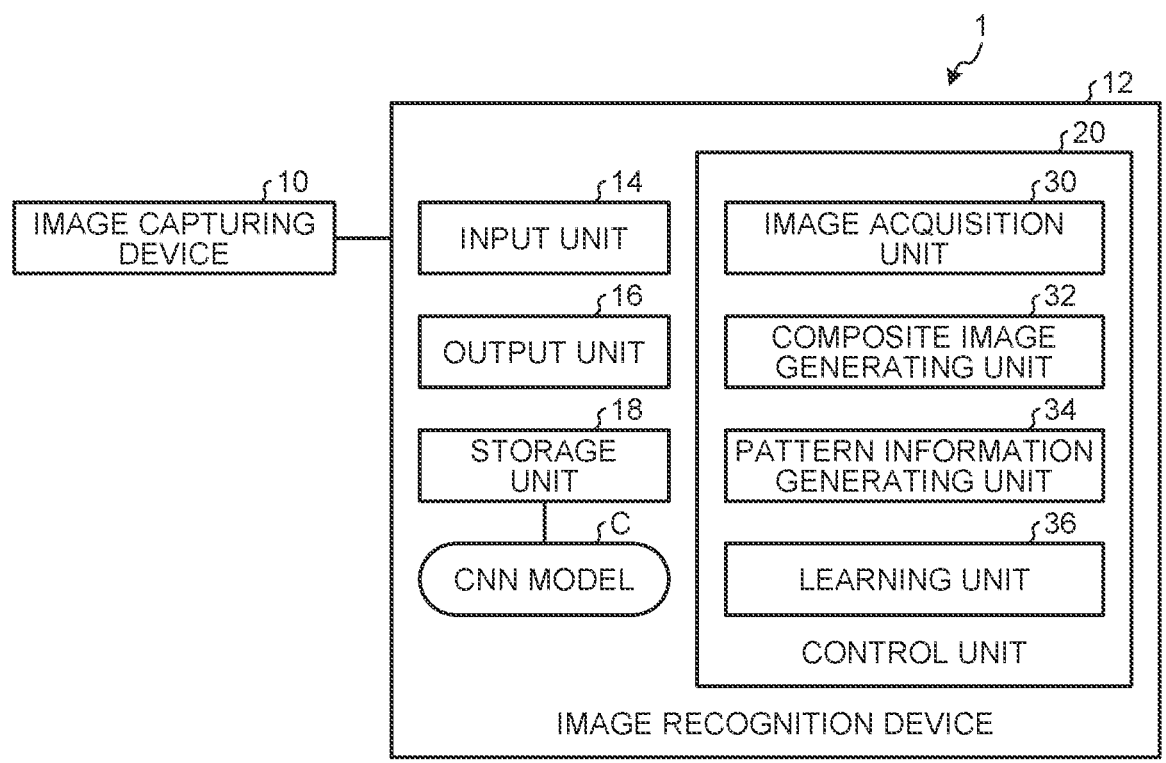
FIG. 1 is a block diagram schematically illustrating an image recognition system according to an embodiment.

FIG. 1 is a block diagram schematically illustrating an image recognition system according to the present embodiment. As illustrated in FIG. 1, an image recognition system 1 according to the present embodiment includes an image capturing device 10 and an image recognition device 12. The image recognition system 1 uses the image recognition device 12 and performs image recognition by analyzing, using a convolutional neural network (CNN) model C, a change pattern of each of images captured by the image capturing device 10 in accordance with a passage of time. In the present embodiment, the image capturing device 10 and the image recognition device 12 are separated devices; however, these devices may be integrally formed as a single device.

The image capturing device 10 is, for example, a video camera. The image capturing device 10 captures an image of a target object at a predetermined shutter speed at a predetermined frame rate, so as to capture a plurality of images obtained every time a period of time has elapsed. In other words, it can be said that the image capturing device 10 captures a plurality of temporally consecutive images. The image capturing device 10 is mounted on a dashboard camera that is mounted on, for example, a vehicle and captures the surroundings of the vehicle; however, the image capturing device 10 is not limited to this and may be a device that captures an image of an arbitrary target object.

The image recognition device 12 is, for example, a computer, and includes an input unit 14, an output unit 16, a storage unit 18, and a control unit 20. The input unit 14 is a device that receives an operation performed by an operator and is, for example, a mouse, a keyboard, a touch panel, or the like. The output unit 16 is a device that outputs information, and includes a display device that displays control content of, for example, the control unit 20. The storage unit 18 is a memory that stores therein content of an arithmetic operation performed in the control unit 20, information on programs, and the like. The storage unit 18 includes at least one of main storage unit, such as a read only memory (ROM), and an external storage unit, such as a hard disk drive (HDD); may include a volatile storage unit, such as a random access memory (RAM); and may read and execute the CNN model C from, for example, the ROM to the RAM. The storage unit 18 stores therein the CNN model C. The CNN model C will be described later.

The control unit 20 is an arithmetic unit, that is, a central processing unit (CPU). The control unit 20 includes an image acquisition unit 30, a composite image generating unit 32, a pattern information generating unit 34, and a learning unit 36. The image acquisition unit 30, the composite image generating unit 32, the pattern information generating unit 34, and the learning unit 36 are implemented by the control unit 20 reading software (programs) stored in the storage unit 18, and perform processes described later.

Figure 2:
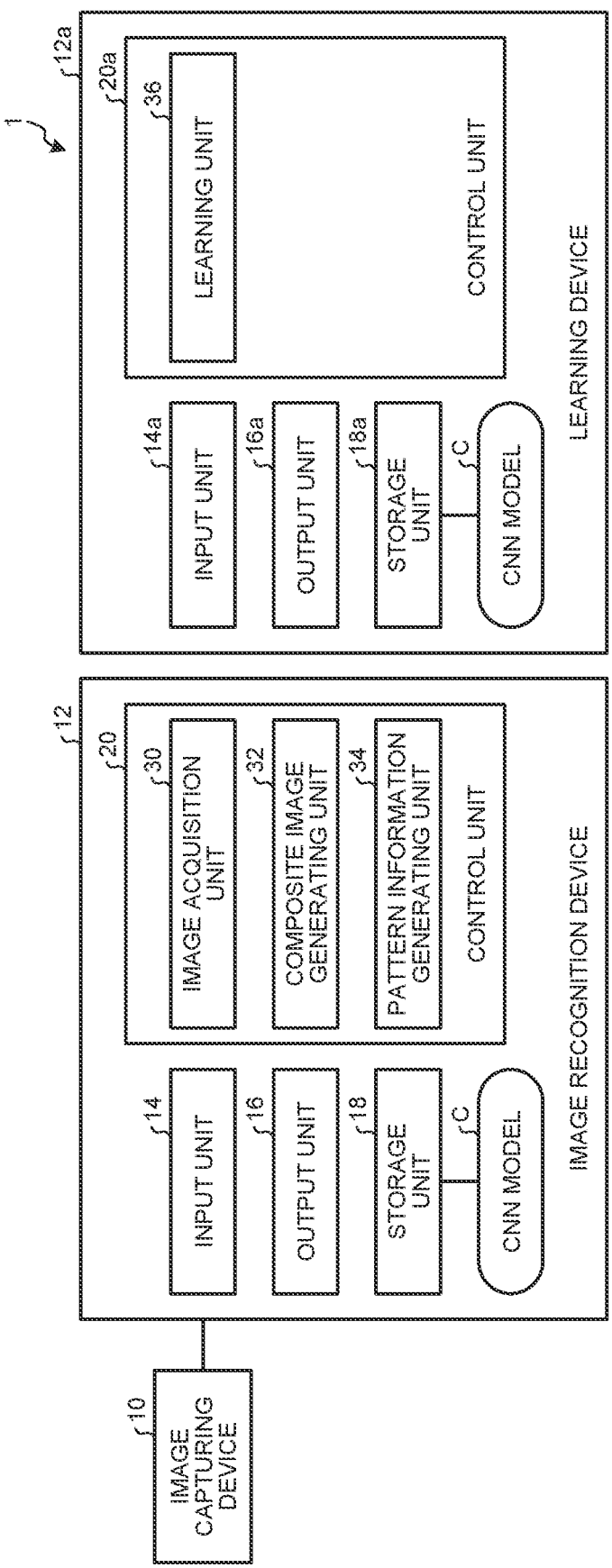
FIG. 2 is a block diagram illustrating another example of the image recognition system according to the embodiment.

FIG. 2 is a block diagram illustrating another example of the image recognition system according to the present embodiment. In the example illustrated in FIG. 1, the learning unit 36 is included in the control unit 20 that is included in the image recognition device 12; however, the learning unit 36 need not be included in the control unit 20, and may be separately stored in, for example, a computer, a cloud server, or the like that is different from the image recognition device 12. The learning unit 36 may be configured to read data that is needed to perform learning, which will be described later, from the storage unit 18 or, for example, an external storage unit that is placed outside the image recognition device 12; generate the leaned CNN model C on the basis of the data needed for the learning; and store the generated data in the storage unit 18. FIG. 2 illustrates an example of a case in which the learning unit 36 is arranged in a device that is different from the image recognition device 12. As illustrated in FIG. 2, the image recognition system 1 in this case includes a learning device 12a, in addition to the image capturing device 10 and the image recognition device 12. The learning unit 36 is not included in the control unit 20 that is included in the image recognition device 12 illustrated in FIG. 2. The learning device 12a is, for example, a computer, and includes an input unit 14a, an output unit 16a, a storage unit 18a, and a control unit 20a. The configurations of the input unit 14a, the output unit 16a, and the storage unit 18a are the same as those of the input unit 14, the output unit 16, and the storage unit 18, respectively, included in the image recognition device 12. The control unit 20a is an arithmetic unit, that is, a CPU, and includes the learning unit 36. The CNN model C that has been generated by the learning unit 36 included in the learning device 12a is transmitted to the image recognition device 12 and stored in the storage unit 18. The configuration illustrated in FIG. 2, that is, the configuration in which the learning unit 36 is arranged outside the image recognition device 12, may also be used in a second embodiment that will be described later.

The image acquisition unit 30 acquires image data P that is data of an image captured by the image capturing device 10. The image acquisition unit 30 acquires a plurality of pieces of the image data P captured by the image capturing device 10 in accordance with a passage of time. In other words, the pieces of image data P acquired by the image acquisition unit 30 are pieces of data of temporally consecutive images. For example, the image acquisition unit 30 acquires the image data P every time the image capturing device 10 captures an image at a predetermined frame rate.

Figure 3:
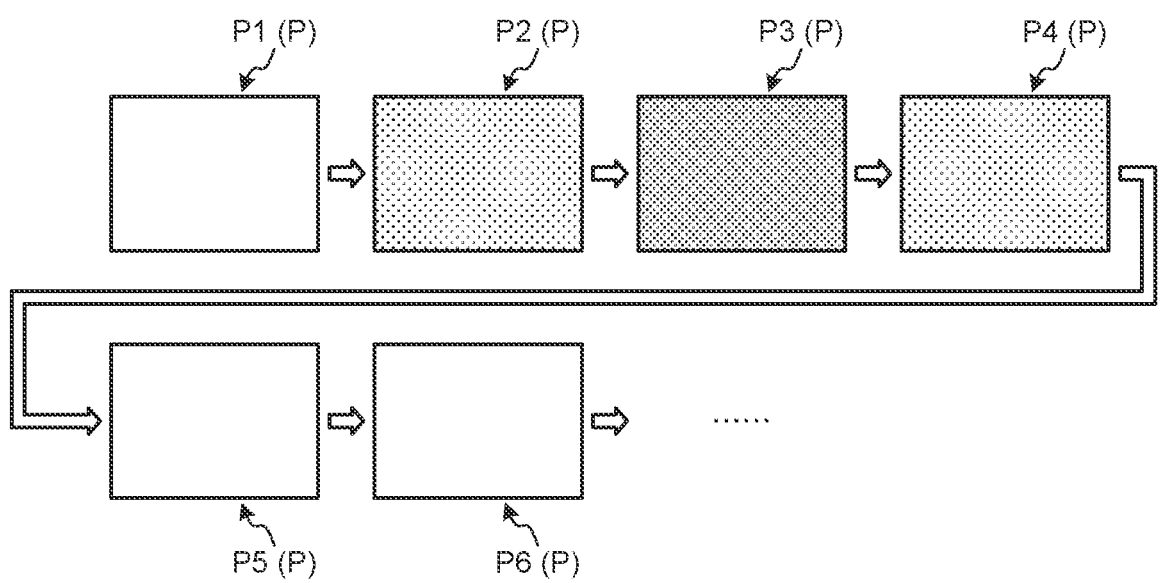
FIG. 3 is a schematic diagram illustrating an example of image data acquired by an image acquisition unit.

FIG. 3 is a schematic diagram illustrating an example of image data acquired by the image acquisition unit. Here, even if the image capturing device 10 performs fixed point image capturing, the captured images (the image data P) obtained by the image capturing device 10 may be changed in an unexpected change pattern with the passage of time. The change pattern mentioned here indicates a change in luminance of the entire image with the passage of time, and more specifically, a so-called flicker phenomenon in which the image flickers due to the change in luminance with the passage of time. In the example illustrated in FIG. 3, image capturing is performed every time a period of time has elapsed, in the order of pieces of image data P1, P2, P3, P4, P5, P6, and . . . . For example, the image data P2 is the image data captured by the image capturing device 10 immediately after the image data P1. In the example illustrated in FIG. 3, the luminance of the entire image of each of the pieces of image data P2, P3, and P4 is lower than the luminance of the other pieces of image data P. Accordingly, if the image data P illustrated in FIG. 3 is replayed as a moving image, the luminance is changed with the passage of time and is visually recognized as flicker by a user.

In this way, depending on a change pattern of the image data P, the moving image may be adversely affected, such as flicker, and the moving image may not be used appropriately. It may be possible to eliminate the adverse effect by checking a change pattern of each of the pieces of image data P by a user; however, since a load exerted on the user is increased when, for example, the number of pieces of image data P is increased, it is required to automatically recognize a change pattern of the image data P. In contrast, the image recognition device 12 according to the present embodiment recognizes, by using the CNN model C, a change pattern of each of the pieces of image data P in accordance with a passage of time (here, recognize whether flicker occurs). However, since it is difficult for the CNN to observe the passage of time, the change pattern of the image data P may not be appropriately recognized. In contrast, in the image recognition device 12 according to the present embodiment, the image acquisition unit 30 and the composite image generating unit 32 process the image data to be input to the CNN model C, so that the change pattern of the image data P can be appropriately recognized by using the CNN model C. In the following, a specific description will be given.

The image acquisition unit 30 illustrated in FIG. 1 performs a process of reducing the size of the image data P, that is, a process of resizing the image data P, acquired from the image capturing device 10. For example, the image acquisition unit 30 reduces the size of the image data P by sampling, from the acquired image data P, pixel data (a luminance value of a pixel) every predetermined number of pixels and arranging the sampled pieces of pixel data. Reduction of the size of the image data P is not limited to sampling the pixel data. For example, the size of the image data P may be reduced by calculating, from a predetermined number of pixels, a representative value, such as a mean value, a median value, a variance, a standard deviation, a mode value, a maximum value, a minimum value, a midpoint value, and a difference value between a maximum value and a minimum value, and using the calculated representative value.

Figure 4:
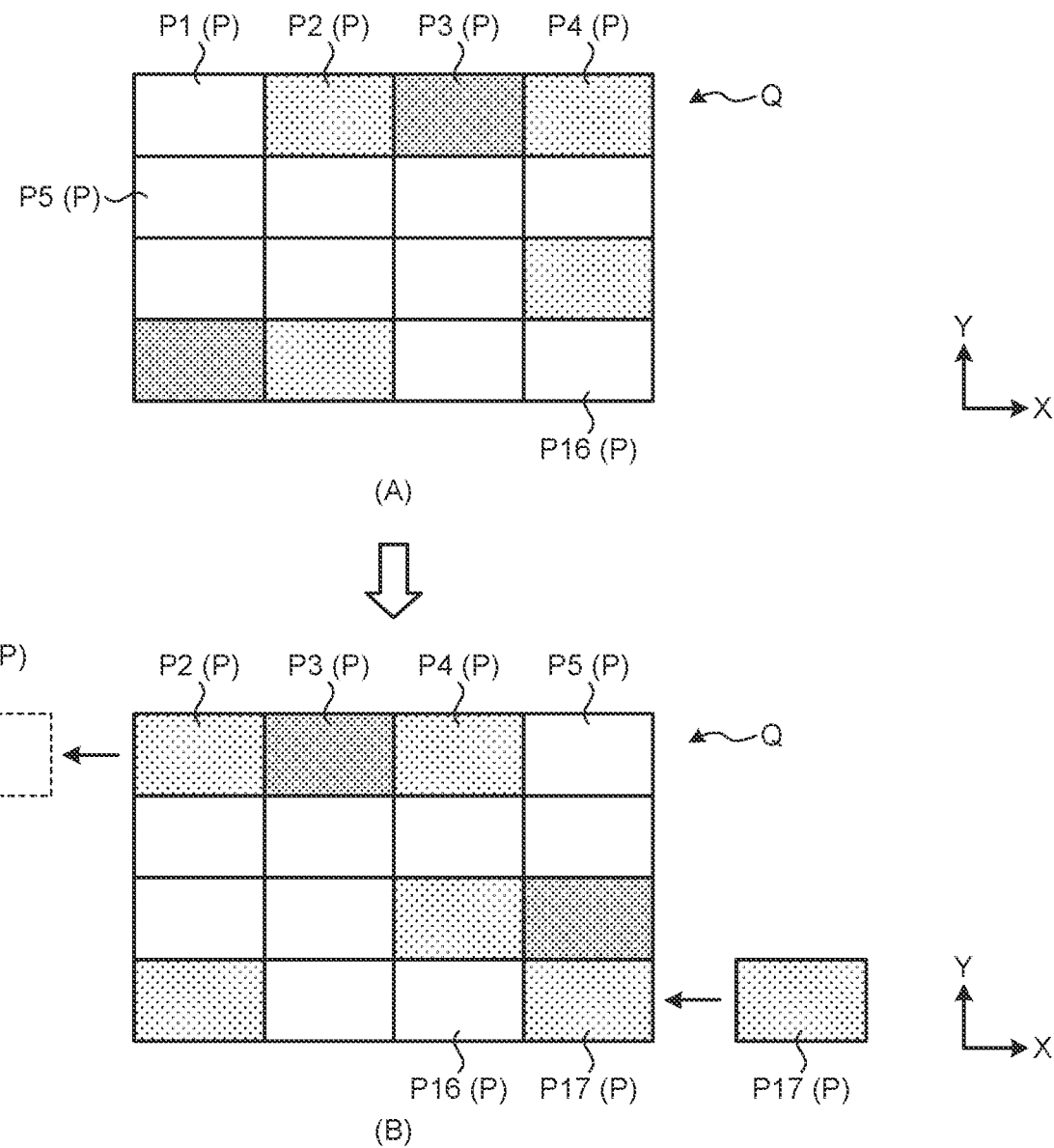
FIG. 4 is a schematic diagram illustrating an example of a composite image.

FIG. 4 is a schematic diagram illustrating an example of a composite image. The composite image generating unit 32 acquires the image data P that are reduced in size from the image acquisition unit 30. The composite image generating unit 32 arranges the acquired pieces of image data P and generates composite image data Q. In other words, the composite image data Q is the image data obtained by arranging the plurality of pieces of image data P that are captured in accordance with a passage of time, that is, the image data obtained by arranging the plurality of pieces of image data P having consecutive image capturing time. In the present embodiment, the composite image generating unit 32 arranges the pieces of image data P in a matrix manner, that is, in a direction X and a direction Y (see FIG. 4), so that the composite image data Q is obtained by arranging the pieces of image data P in a matrix manner. In the example indicated by (A) in FIG. 4, 16 pieces of image data starting from the image data P1 to image data P16 captured in accordance with a passage of time are arranged in a matrix with four rows and four columns. However, the order in which the pieces of image data P are arranged in the composite image data Q is not limited to this. The arrangement order of the pieces of image data P is not limited to the matrix with four rows and four columns as illustrated in FIG. 4, and also, is not limited to a form of a matrix. Furthermore, the composite image generating unit 32 acquires the image data P that has been subjected to size reduction process by the image acquisition unit 30; therefore, in the composite image data Q, the pieces of image data P that are reduced in size are arranged. However, the size reduction process of the image data P need not necessarily be performed, and, in the composite image data Q, the pieces of image data P that are not reduced in size may be arranged.

The composite image generating unit 32 may subtract a mean value of luminance of the image data P from a luminance value at each of the coordinates (each pixel) in the composite image data Q in which the plurality of pieces of image data P are arranged and may use the composite image data Q in which the mean value of the luminance has been subtracted as the composite image data Q used by the pattern information generating unit 34 that will be described later. The mean value of the luminance of the image data P mentioned here indicates the mean value of the luminance of all of the pieces of image data P that are included in the composite image data Q. In other words, in the example indicated by (A) in FIG. 4, the mean value is obtained by averaging the luminance of each of the coordinates (each pixel) of the pieces of image data P1 to P16. As a result, it is possible to allow the composite image data Q used by the pattern information generating unit 34 to be an image in which the degree of lightness and darkness is clearer, and it is thus possible to more appropriately recognize a change pattern of the image data P.

The composite image generating unit 32 acquires, every time the image acquisition unit 30 acquires a new piece of the image data P, in other words, every time the image capturing device 10 captures an image, the new piece of image data P. Then, the composite image generating unit 32 updates the composite image data Q by arranging the newly acquired piece of image data P in the composite image data Q. For example, as indicated by (B) in FIG. 4, the composite image generating unit 32 acquires image data P17 that is captured subsequent to the image data P16 having the latest image capturing time included in the composite image data Q. The composite image generating unit 32 removes, from the composite image data Q, the image data P1 having the earliest image capturing time included in the composite image data Q, and then, adds the new image data P17 to the composite image data Q. Then, the composite image generating unit 32 updates the composite image data Q by arranging the image data P, that is, in the example illustrated in FIG. 4, the pieces of image data P2 to P17, included in the composite image data Q in a matrix manner.

The pattern information generating unit 34 illustrated in FIG. 1 acquires the composite image data Q generated by the composite image generating unit 32 and reads the trained CNN model C that is stored in the storage unit 18. The pattern information generating unit 34 generates, by inputting the input data based on the composite image data Q to the CNN model C, pattern information that is information on a change pattern of the image data P in accordance with the passage of time. The CNN model C is a neural network model in which weight coefficients and bias values are learned by the learning unit 36. Before explaining a generating process of the pattern information performed by the pattern information generating unit 34, a generating process of the trained CNN model C obtained by the learning unit 36 will be described.

Figures 5, 6:
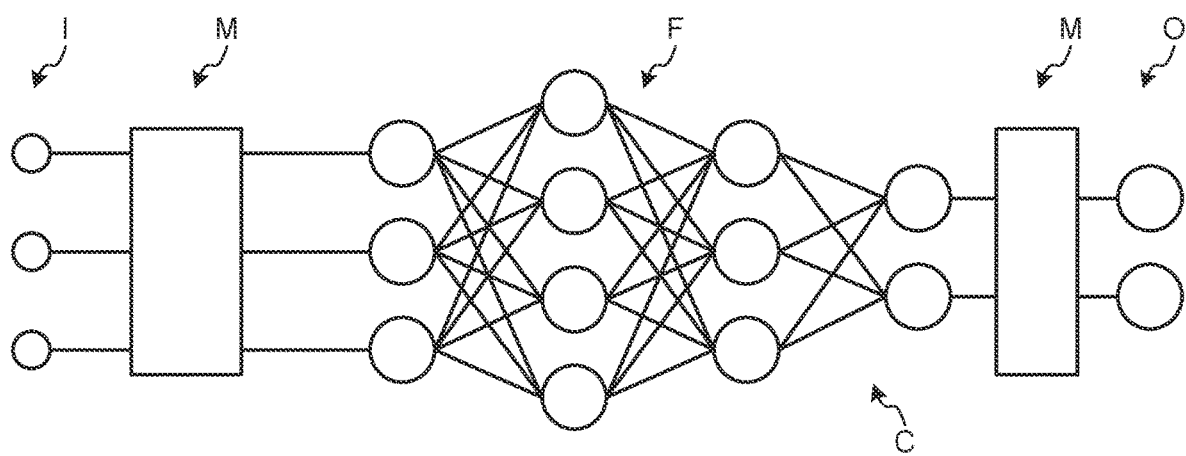
FIG. 5 is a conceptual schematic diagram of a CNN model.
FIG. 6 is a diagram illustrating an example of teacher data.

FIG. 5 is a conceptual schematic diagram of the CNN model. The CNN model C is constituted of a model (structure information on a neural network) that defines a neural network constituting classifiers learned by deep learning, and variables. The CNN model C can compare the input data with the trained data to determine the degree of similarity, for example, what is the percentage of the degree of similarity. Deep learning is one of the methods of machine learning, and is, in a narrow sense, constituted of a neural network formed of four or more layers. More specifically, as illustrated in FIG. 5, the CNN model C includes a middle layer M, which includes a plurality of convolution layers and a plurality of pooling layers, and a final layer F that includes a fully-connected layer. In the CNN model C, when input data I is input, the middle layer M and the final layer F perform an arithmetic operation and output output data O.

The learning unit 36 generates the trained CNN model C by setting the weight coefficients and the bias values in the CNN model C using teacher data. The learning unit 36 acquires learning purpose composite image data Qa as the teacher data. The learning purpose composite image data Qa is image data in which pieces of learning purpose image data Pa are arranged in a matrix manner. The pieces of learning purpose image data Pa are pieces of image data that are captured in accordance with a passage of time (pieces of image data captured at consecutive image capturing time), and that are captured in advance. Therefore, a change pattern of each of the pieces of learning purpose image data Pa included in the learning purpose composite image data Qa in accordance with the passage of time is already known. The learning purpose composite image data Qa is generated by using the same process as that used for the composite image data Q, except that the pieces of learning purpose image data Pa are arranged instead of the pieces of image data P that are targeted for image recognition. In other words, arrangement of the pieces of learning purpose image data Pa in the learning purpose composite image data Qa is the same arrangement of the pieces of image data P in the composite image data Q. The pieces of learning purpose image data Pa may be any pieces of image data captured in accordance with a passage of time, and the target object captured as the learning purpose image data Pa may be arbitrary.

In the learning purpose composite image data Qa, the pattern information on the learning purpose image data Pa included in the learning purpose composite image data Qa, that is, a change pattern of each of the pieces of learning purpose image data Pa in accordance with a passage of time, is already known. In other words, it can be said that the learning unit 36 also acquires the information on a change pattern of each of the pieces of learning purpose image data Pa included in the learning purpose composite image data Qa. The learning unit 36 assigns a label that indicates a change pattern of the learning purpose image data Pa to the learning purpose composite image data Qa. FIG. 6 is a diagram illustrating an example of the teacher data. In the example illustrated in FIG. 6, the learning unit 36 acquires, as the teacher data, learning purpose composite image data Qa1 in which flicker occurs and information indicating that the flicker occurs in the learning purpose composite image data Qa1, and then, assigns a label L1 to the learning purpose composite image data Qa1. In other words, the label L1 mentioned here is a label indicating "with flicker". The learning unit 36 acquires a plurality of types of the learning purpose composite image data Qa in which flicker occurs, and assigns the common label L1 to all of the corresponding pieces of learning purpose composite image data Qa. In addition to the learning purpose composite image data Qa in which flicker occurs, the learning unit 36 may also acquire, as teacher data, the learning purpose composite image data Qa in which flicker does not occur. In this case, the learning unit 36 assigns a label L0 that is different from the label L1 to the learning purpose composite image data Qa in which flicker does not occur. In other words, the label L0 is a label indicating "without flicker". However, it is sufficient for the learning unit 36 to acquire, as the teacher data, at least only the learning purpose composite image data Qa in which flicker occurs, in other words, it is sufficient to acquire, as the teacher data, only the learning purpose composite image data Qa to which a single common label is allocated.

More specifically, the learning unit 36 inputs data based on the learning purpose composite image data Qa acquired as the teacher data to the CNN model C as the input data I, and then inputs, to the CNN model C, information indicating that the subject learning purpose composite image data Qa is assigned to the label L1. As a result, the learning unit 36 calculates the weight coefficients and the bias values of the CNN model C by using backpropagation (error back propagation method). In other words, when the learning unit 36 inputs the input data I based on the learning purpose composite image data Qa to the CNN model C, the learning unit 36 calculates the weight coefficients and the bias values so as to output an arithmetic operation result indicating that the label of the subject learning purpose composite image data Qa is the label L1. The learning unit 36 divides the learning purpose composite image data Qa into a plurality of pieces of image data in the direction X and the direction Y, and sets gradation levels of R (red), G (green), B (blue) in the divided pieces of image data as the input data I. However, the input data I is not limited to the gradation levels of R, G, and B in the divided pieces of image data, and may be data based on the learning purpose composite image data Qa.

The learning unit 36 generates the trained CNN model C by calculating the weight coefficients and the bias values described above, and stores the trained CNN model C in the storage unit 18. The learning unit 36 is incorporated in a single device together with the pattern information generating unit 34 in an integrated manner; however, the learning unit 36 may be incorporated in another device that is separated from the pattern information generating unit 34.

Figure 7:
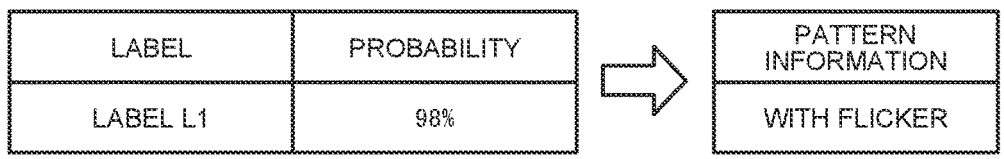
FIG. 7 is a diagram illustrating an example of a calculation result of pattern information obtained by a pattern information generating unit.

FIG. 7 is a diagram illustrating an example of the calculation result of the pattern information performed by the pattern information generating unit. The pattern information generating unit 34 reads the trained CNN model C generated by the learning unit 36 from the storage unit 18, and acquires the composite image data Q generated by the composite image generating unit 32. The pattern information generating unit 34 inputs the input data I based on the composite image data Q to the trained CNN model C. As a result, the pattern information generating unit 34 generates, by using the arithmetic operation performed in the CNN model C, the pattern information that indicates a change pattern of each of the pieces of image data P in accordance with a lapse of time. Specifically, the gradation levels of R (red), G (green), and B (blue) in the pieces of image data obtained by dividing the composite image data Q are input to the trained CNN model C as the input data I, and then, the arithmetic operation is performed. The pattern information generating unit 34 calculates, using the CNN model C, a probability that the composite image data Q is allocated to the label L1 as the output data O. In the example illustrated in FIG. 7, the pattern information generating unit 34 calculates, as the output data O, the information indicating that the probability that the composite image data Q is allocated to the label L1 indicating "with flicker" is 98%. In a case where the labels to be allocated to the learning purpose composite image data Qa at the time of learning are the label L1 indicating "with flicker" and a label L2 indicating "without flicker", the pattern information generating unit 34 calculates, as the output data O, a probability to be allocated to the label L1 and a probability to be allocated to the label L0.

For example, the pattern information generating unit 34 determines that the composite image data Q is allocated to the label in which the allocated probability is equal to or greater than a predetermined value, and then, derives information on a change pattern corresponding to the allocated label as the pattern information. In the example illustrated in FIG. 7, the probability that the composite image data Q is allocated to the label L1 is equal to or greater than the predetermined value, so that the pattern information generating unit 34 determines that flicker occurs, and then derives, as the pattern information, the information indicating that the image data P in which flicker occurs is included in the composite image data Q. When the probability that the composite image data Q is allocated to the label L1 is less than the predetermined value, the pattern information generating unit 34 determines that flicker does not occur, and then derives, as the pattern information, the information indicating that the image data P in which flicker occurs is not included in the composite image data Q. The pattern information generating unit 34 causes the output unit 16 to output the derived pattern information.

The pattern information generating unit 34 derives the pattern information by performing the arithmetic operation in the CNN model C every time the composite image data Q is updated. Accordingly, the pattern information generating unit 34 is able to consecutively recognize change patterns of the image data P.

The image recognition device 12 performs image recognition by sequentially generating the information on a change pattern of each of the pieces of image data P in accordance with a passage of time by using the trained CNN model C described above. As described above, with the CNN model C, it is difficult to recognize a change with the passage of time, and thus, it is difficult to recognize a change pattern of the image data P. In contrast, the image recognition device 12 according to the present embodiment performs the arithmetic operation with the CNN model C using the input data I based on the composite image data Q by arranging the pieces of image data P obtained every time a period of time has elapsed onto a single piece of the composite image data Q. Accordingly, according to the present embodiment, it is possible to recognize a change with the passage of time of the image data P with the CNN model C as a feature amount of a single piece of the composite image data Q, so that it is possible to appropriately recognize a change pattern of the image data P. For example, when flicker occurs, the composite image data Q is an image including light-and-dark patterns of luminance in which pieces of image data each having low luminance and pieces of image data each having high luminance are arranged. Accordingly, the image recognition device 12 extracts the feature amount of the light-and-dark patterns of the luminance of the composite image data Q with the CNN model C and performs label classification on the basis of the subject feature amount, so that it becomes possible to recognize a change pattern of the image data P, i.e., whether flicker occurs.

Figure 8:
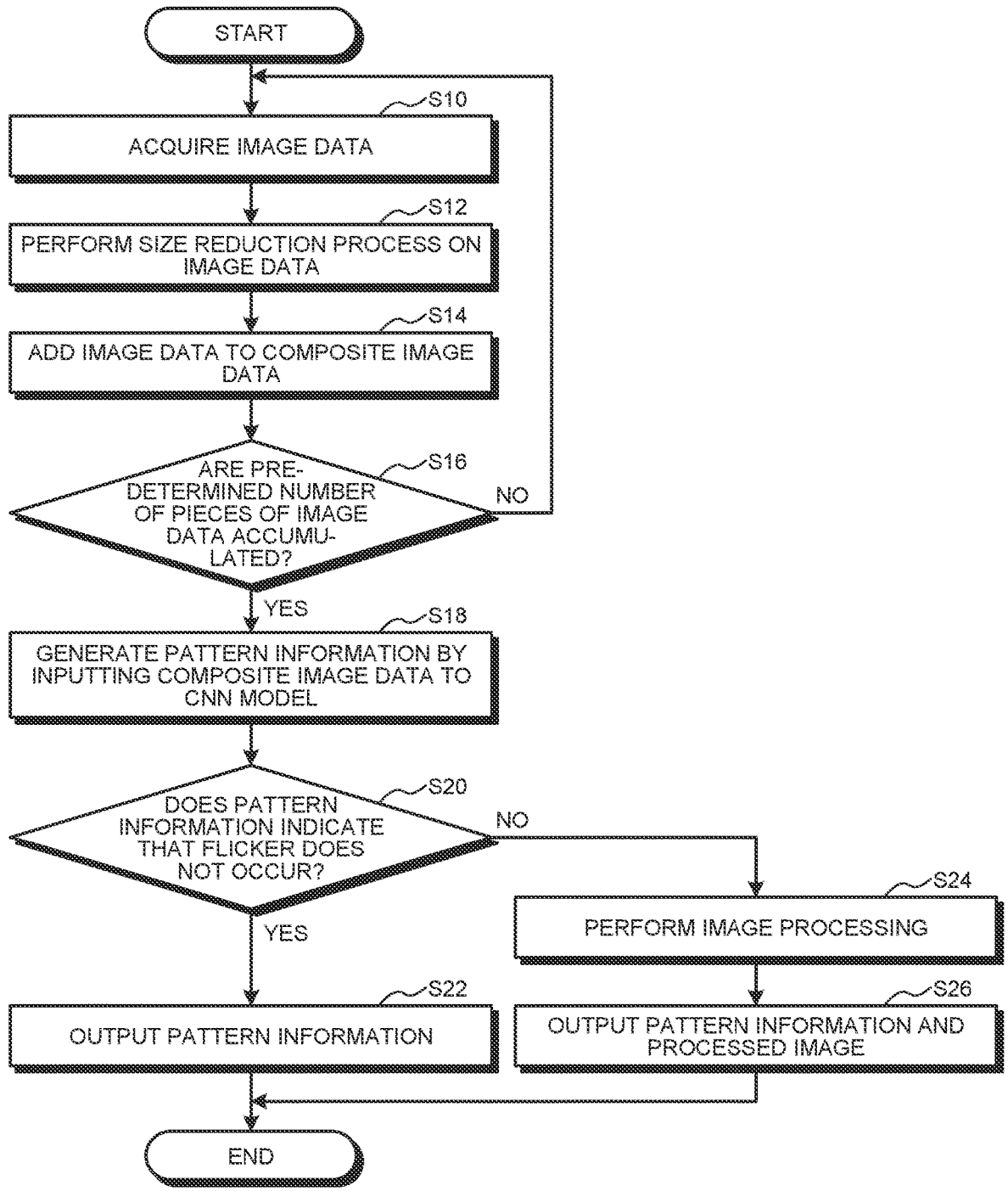
FIG. 8 is a flowchart illustrating the flow of image recognition process performed by an image recognition device.

In the following, the flow of the image recognition process performed by the image recognition device 12 will be described on the basis of a flowchart. FIG. 8 is a flowchart illustrating the flow of the image recognition process performed by the image recognition device. As illustrated in FIG. 8, the image recognition device 12 acquires, by using the image acquisition unit 30, the image data P of an image captured by the image capturing device 10 (Step S10), and performs a size reduction process on the acquired image data P (Step S12). The image recognition device 12 acquires, by using the composite image generating unit 32, the image data P that has been reduced in size by the image acquisition unit 30, and adds the image data P to the composite image data Q (Step S14). In other words, the composite image generating unit 32 arranges the image data P in the composite image data Q. Then, when a predetermined pieces of the image data P are not accumulated in the composite image data Q (No at Step S16), the image recognition device 12 returns to Step S10, acquires the image data P of an image that is captured at the next timing, and proceeds to the subsequent process. When the predetermined pieces of image data P are accumulated in the composite image data Q (Yes at Step S16), the image recognition device 12 inputs, by using the pattern information generating unit 34, the composite image data Q to the CNN model C, and generates the pattern information (Step S18). Specifically, the pattern information generating unit 34 reads the trained CNN model C, inputs the input data I based on the composite image data Q to the read CNN model C, and performs the arithmetic operation by using the CNN model C. Then, the image recognition device 12 generates the pattern information from the output data O that is the arithmetic operation result of the CNN model C (for example, information on the probability that the composite image data Q is classified into the label). Then, when the pattern information indicates that flicker does not occur (Yes at Step S20), the image recognition device 12 outputs the pattern information, that is, information indicating that flicker does not occur, to the output unit 16 (Step S22). In contrast, when the pattern information indicates that flicker occurs (No at Step S20), the image recognition device 12 performs image processing on the image data P that is included in the composite image data Q that is determined to be the image data with flicker, and then, for example, increases the luminance of the image in which luminance is decreased (Step S24). Then, the image recognition device 12 outputs the pattern information indicating that flicker has occurred and the image that has been subjected to image processing to the output unit 16 (Step S26). As a result, the process has been completed.

As described above, the image recognition device 12 according to the present embodiment includes the image acquisition unit 30, the composite image generating unit 32, and the pattern information generating unit 34. The image acquisition unit 30 acquires a plurality of pieces of image data P captured in accordance with a passage of time. The composite image generating unit 32 generates the composite image data Q in which the plurality of pieces of image data P are arranged. The pattern information generating unit 34 acquires the CNN model C that is a trained convolutional neural network model, inputs the input data I that is based on the composite image data Q to the acquired CNN model C, and generates the pattern information that is the information on a change pattern of each of the pieces of image data P in accordance with a passage of time. The image recognition device 12 according to the present embodiment arranges the pieces of image data P obtained every time a period of time has elapsed on a single piece of the composite image data Q, and performs the arithmetic operation, with the CNN model C, by using the input data I based on the composite image data Q. As a result, according to the present embodiment, it is possible to recognize, with the CNN model C, a change with the passage of time of the image data P as the feature amount of the single piece of composite image data Q; therefore, it is possible to appropriately recognize a change pattern of each of the pieces of image data P in accordance with a passage of time while reducing the load of the arithmetic processing.

Furthermore, the composite image generating unit 32 generates the composite image data Q by arranging the plurality of pieces of image data P in a matrix manner. According to the image recognition device 12, the composite image data Q is data in which the pieces of image data P are arranged in a matrix manner, so that it is possible to suitably recognize the pattern of the composite image data Q in which the pieces of image data P are arranged, and it is thus possible to appropriately recognize the change pattern of each of the pieces of image data P in accordance with a passage of time.

Furthermore, the composite image generating unit 32 updates the composite image data Q by arranging, every time the image acquisition unit 30 acquires the image data P, the acquired image data P in the composite image data Q. The pattern information generating unit 34 generates the pattern information every time the composite image data Q is updated. According to the image recognition device 12, it is possible to consecutively recognize the change patterns of the pieces of image data P.

Furthermore, the image recognition system 1 according to the present embodiment includes the image recognition device 12. The image recognition system 1 may include the learning unit 36 that generates the trained CNN model C. The learning unit 36 acquires the learning purpose composite image data Qa in which the pieces of learning purpose image data Pa are arranged. A change pattern of each of the pieces of learning purpose image data in accordance with a passage of time is known. The learning unit 36 generates the trained CNN model C by allowing the CNN model C to performing learning by assigning a label to the learning purpose composite image data Qa. According to the image recognition system 1, the trained CNN model C is generated in this way, it is possible to appropriately recognize the change pattern of each of the pieces of image data P in accordance with a passage of time by using the CNN model C.

The pattern information generating unit 34 generates the information, as the pattern information, indicating whether flicker occurs in the image of the image data P. According to the image recognition device 12, the arithmetic operation is performed with the CNN model C by arranging the pieces of image data P obtained every time a period of time has elapsed on a single piece of the composite image data Q; therefore, it is possible to appropriately detect whether flicker occurs.

Second Embodiment

In the following, a second embodiment will be described. The image recognition device 12 according to the second embodiment is different from the first embodiment in that a plurality of types of labels are set when the CNN model C are trained. In the second embodiment, descriptions of components having the same configuration as those described in the first embodiment will be omitted.

Figure 9:
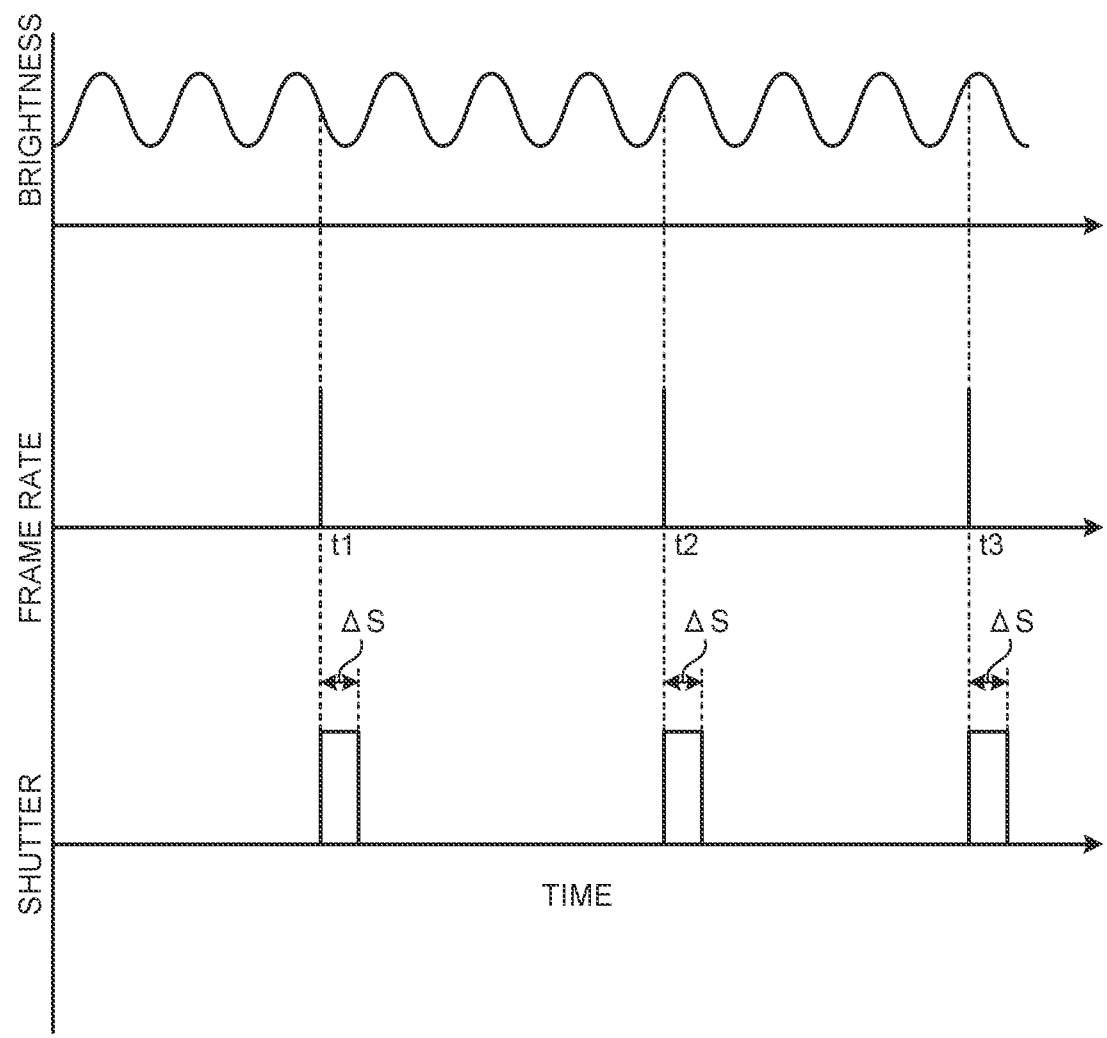
FIG. 9 is a graph illustrating an example of a relationship between an image capturing condition and a change in luminance.
Figure 10:
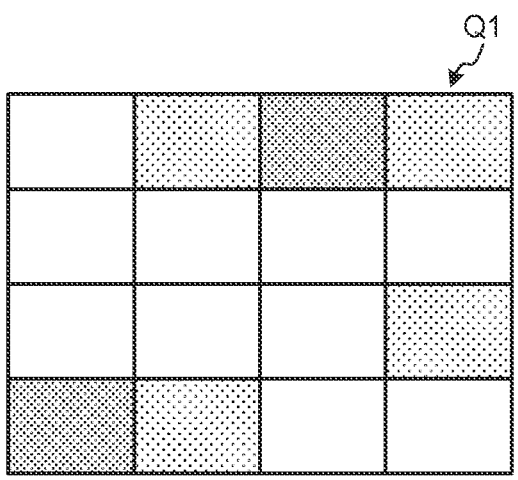
FIG. 10 is a schematic diagram illustrating an example of composite image data in each image capturing condition.
Figure 10:
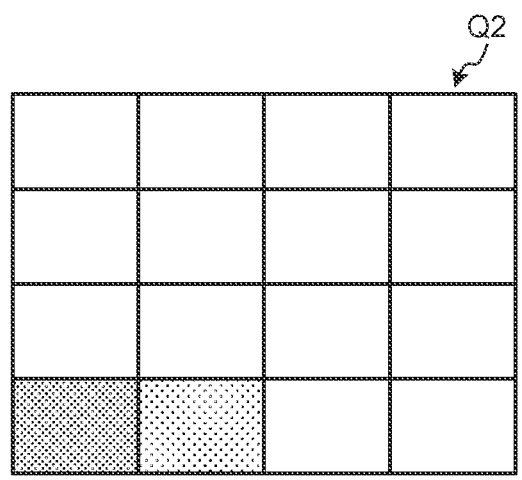
Figure 10:
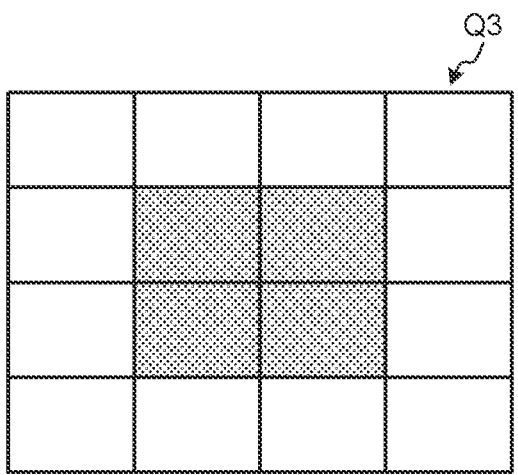
Figure 10:
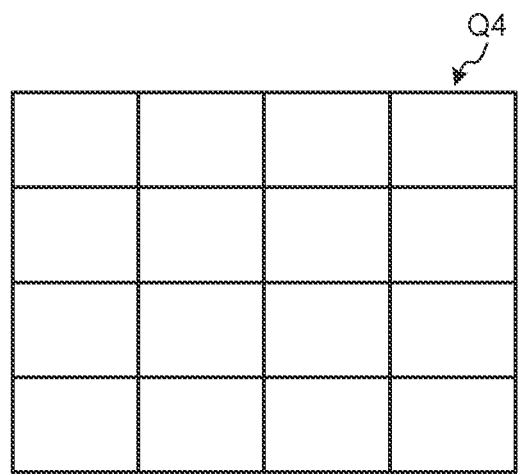

FIG. 9 is a graph illustrating an example of a relationship between an image capturing condition and a change in luminance. FIG. 10 is a schematic diagram illustrating an example of composite image data for each image capturing condition. The image capturing device 10 may capture an image in an environment illuminated by, for example, a light source. The light source emits light according to the frequency of a power source, so that, as illustrated in an upper portion of the graph illustrated in FIG. 9, the brightness of a subject changes with the passage of time according to the frequency of the power source. Therefore, the images (the image data P) captured by the image capturing device 10 may include an image captured at a timing at which the subject is bright and an image captured at a timing at which the subject is dark. For example, in FIG. 9, the images are captured at time t1, t2, and t3 in a period of time As. In this case, the brightness of the subject at time t1 is lower than the brightness of the subject at time t2 and t3, so that the luminance of the image data P at time t1 is lower than the luminance of the image data P at time t2 and t3. For example, in such a case, flicker occurs because bright images and dark images are generated in accordance with a passage of time.

To be more specific, for example, since luminance of the image data P of an image captured at a timing at which the subject is bright tends to be higher, the luminance of the image data P depends on the relationship between the frequency of a change in brightness of the subject and the image capturing timing of the image capturing device 10. The image capturing timing is set by an image capturing condition, that is, here, the frame rate and the shutter speed, of the image capturing device 10. Therefore, if the image capturing conditions are different, the way of a change in lightness and darkness of the image will be different, and thus, the way of a change in lightness and darkness in accordance with a passage of time may be different even between pieces of image data in which flicker occurs. In this way, when the way of a change in lightness and darkness is different, the pieces of composite image data Q each obtained by arranging the pieces of image data P may have different light-and-dark patterns in a single image. FIG. 10 is a diagram for explaining a difference of light-and-dark patterns among the pieces of composite image data Q. In the example illustrated in FIG. 10, the pieces of composite image data Q1, Q2, Q3, and Q4 are obtained by arranging pieces of image data having different image capturing conditions. The pieces of composite image data Q1, Q2, and Q3 each have flicker, but their light-and-dark patterns are different from each other. Furthermore, in the composite image data Q4, light-and-dark pattern is not visually recognized and flicker does not occur.

In this way, the pieces of composite image data Q may have different light-and-dark patterns due to different image capturing conditions. In such a case, if image recognition is performed using the CNN model C, a matching rate of the feature amounts among the pieces of composite image data Q having different light-and-dark patterns is low, and thus, flicker recognition accuracy may possibly be decreased. In contrast, in the second embodiment, by setting a label for each of the image capturing conditions at the time of learning, it is possible to individually recognize the pieces of composite image data Q having different light-and-dark patterns and to recognize flicker with high accuracy. In the following, this will be specifically described.

Figures 11, 12:
FIG. 11 is a diagram illustrating an example of teacher data according to a second embodiment.
FIG. 12 is a diagram illustrating an example of a calculation result of pattern information according to the second embodiment.

FIG. 11 is a diagram illustrating an example of teacher data according to the second embodiment. In the second embodiment, the learning unit 36 acquires, as teacher data, the learning purpose composite image data Qa, in which flicker occurs, and an image capturing condition of each of the pieces of learning purpose image data Pa included in the learning purpose composite image data Qa. In addition, the learning unit 36 acquires the plurality of learning purpose composite image data Qa in which flicker occurs but the image capturing conditions are different. Then, the learning unit 36 assigns a label for each of the image capturing conditions. Specifically, the learning unit 36 assigns the same label to the pieces of learning purpose composite image data Qa each having the same image capturing condition, and assigns different labels to the pieces of learning purpose composite image data Qa having a different image capturing conditions. In the example illustrated in FIG. 11, the learning unit 36 acquires a plurality of pieces of learning purpose composite image data Qa1, in which the image capturing condition is M1 and flicker occurs, a plurality of pieces of learning purpose composite image data Qa2 in which the image capturing condition is M2 and flicker does not occur, and a plurality of pieces of learning purpose composite image data Qa3 in which the image capturing condition is M3 and flicker occurs. Then, the learning unit 36 assigns the label L1 to the learning purpose composite image data Qa1, assigns the label L2 to the learning purpose composite image data Qa2, and assigns a label L3 to the learning purpose composite image data Qa3. In other words, the label L1 is a label that indicates the image data having flicker and an image capturing condition M1, the label L2 is a label that indicates the image data having flicker and an image capturing condition M2, and the label L3 is a label that indicates the image data having flicker and an image capturing condition M3. However, the number of labels is not limited to three and any number of labels may be used. Furthermore, in the example illustrated in FIG. 11, the learning unit 36 acquires only the learning purpose composite image data Qa in which flicker occurs; however, the learning unit 36 may acquire the learning purpose composite image data Qa in which flicker does not occur. In this case, the learning unit 36 may assign a label that is different from the label assigned to the learning purpose composite image data Qa in which flicker occurs to the learning purpose composite image data Qa in which flicker does not occur.

The image capturing condition in the present embodiment is the frame rate and the shutter speed. In other words, the learning unit 36 assigns the same label to the pieces of learning purpose composite image data Qa in which the frame rate and the shutter speed are common, and assigns different labels to the pieces of learning purpose composite image data Qa in which at least one of the frame rate and the shutter speed is different. However, the image capturing condition is not limited to the frame rate and the shutter speed, but may be, for example, a difference caused by a background pattern of an image. For example, a plurality of background patterns based on a color, and a shape of a background of an image may be defined, and different labels may be assigned to the background patterns to form the same group. For example, a group in which a mountain is included in a background of a rural landscape image, a group in which the sea is included in a background of a landscape image at a swimming beach, and the like may be classified into the same group in advance for each predetermined background pattern.

Then, the learning unit 36 inputs data based on the learning purpose composite image data Qa1, Qa2, and Qa3 to the CNN model C as the input data I, and inputs, to the CNN model C, information indicating that the labels L1, L2, and L3 are allocated to the pieces of learning purpose composite image data Qa1, Qa2, and Qa3, respectively. As a result, the learning unit 36 calculates weight coefficients and bias values of the CNN model C by using backpropagation (error back propagation method). In other words, when the learning unit 36 inputs the input data I based on the learning purpose composite image data Qa1, Qa2, and Qa3 to the CNN model C, the learning unit 36 calculates the weight coefficients and the bias values so as to output the arithmetic operation result indicating that the labels of the learning purpose composite image data Qa1, Qa2, and Qa3 are the labels L1, L2, and L3, respectively.

FIG. 12 is a diagram illustrating an example of calculation results of pattern information according to the second embodiment. The pattern information generating unit 34 reads the trained CNN model C generated by the learning unit 36, and inputs the input data I based on the composite image data Q to the CNN model C. The pattern information generating unit 34 calculates, with the CNN model C, the probability that the composite image data Q is allocated to each of the labels, as the output data O. In the example illustrated in FIG. 12, the pattern information generating unit 34 calculates information, as the output data O, indicating that the probability that the composite image data Q is allocated to the label L1 is 5%, the probability that the composite image data Q is allocated to the label L2 is 9%, and the probability that the composite image data Q is allocated to the label L3 is 85%. In the example illustrated in FIG. 12, the probability that the composite image data Q is allocated to the label L3 indicating an image with flicker is equal to or greater than the predetermined value, so that the pattern information generating unit 34 determines that flicker occurs and derives information, as pattern information, indicating that the image data P in which flicker occurs is included in the composite image data Q. In the present embodiment, the pattern information generating unit 34 outputs the information, as the pattern information, indicating whether flicker occurs in the composite image data Q; however, the pattern information generating unit 34 may also output information, as the pattern information, indicating which label has been assigned to the composite image data Q, in other words, information indicating which image capturing condition is used to capture an image.

As described above, the image recognition device 12 according to the second embodiment assigns a label for each of the image capturing conditions at the time of learning to generate the trained CNN model C. As described above, the light-and-dark pattern of the composite image data Q depends on the image capturing condition, so that it is possible to classify the composite image data Q into each of the light-and-dark patterns by assigning the label for each of the image capturing conditions, and it is thus possible to improve detection accuracy of flicker.

As described above, with the image recognition device 12 according to the second embodiment, the learning unit 36 sets the plurality of labels. By setting the plurality of labels, it is possible to appropriately recognize a change pattern of each of the pieces of image data P included in the composite image data Q in accordance with a passage of time even in a case where, for example, the light-and-dark patterns of the composite image data Q are various.

Furthermore, the learning unit 36 according to the second embodiment sets the label for each of the image capturing conditions of the learning purpose image data Pa. By setting the labels for each of the image capturing conditions, it is possible to classify the composite image data Q into each of the light-and-dark patterns, and it is thus possible to appropriately recognize a change pattern of each of the pieces of the image data P in accordance with a passage of time.

Furthermore, the learning unit 36 according to the second embodiment sets a label for each of the combinations of the shutter speed and the frame rate that are used when the associated pieces of learning purpose image data Pa are captured. By setting the label for each of the combinations of the shutter speed and the frame rate, it is possible to set the label at each image capturing timing, and it is thus possible to appropriately recognize a change pattern of each of the pieces of the image data P in accordance with a passage of time by appropriately classifying the pieces of composite image data Q into each of the light-and-dark patterns.

According to the embodiments, it is possible to appropriately recognize a change pattern of images in accordance with a passage of time while reducing the load of arithmetic processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image recognition device comprising:
an image acquisition unit configured to acquire a plurality of pieces of image data captured in accordance with a passage of time;
a composite image generating unit configured to generate composite image data in which the plurality of pieces of image data are arranged; and
a pattern information generating unit configured to generate pattern information that is information on a change pattern of each of the pieces of image data in accordance with the passage of time by acquiring a CNN model that is a trained convolutional neural network model and inputting input data that is based on the composite image data to the acquired CNN model, the pattern information indicating whether flicker occurs in an image of the image data.

2. The image recognition device according to claim 1, wherein the composite image generating unit generates the composite image data by arranging the plurality of pieces of image data in a matrix manner.

3. The image recognition device according to claim 1, wherein
the composite image generating unit updates the composite image data by adding, every time the image acquisition unit acquires a piece of image data, the acquired image data to the composite image data, and
the pattern information generating unit generates the pattern information every time the composite image data is updated.

4. An image recognition system comprising:
the image recognition device according to claim 1; and
a learning unit configured to generate the CNN model, wherein
the learning unit generates the CNN model by acquiring learning purpose composite image data in which a plurality of pieces of learning purpose image data are arranged, and assigning a label to the learning purpose composite image data, wherein a change pattern of each of the pieces of learning purpose image data in accordance with a passage of time is known.

5. The image recognition system according to claim 4, wherein the learning unit sets a plurality of different types to the labels.

6. The image recognition system according to claim 5, wherein the learning unit sets the label for each image capturing condition of the learning purpose image data.

7. The image recognition system according to claim 6, wherein the learning unit sets the label for each combination of a shutter speed and a frame rate that are used when the learning purpose image data is captured.

8. An image recognition method comprising:
acquiring a plurality of pieces of image data captured in accordance with a passage of time;
generating composite image data in which the plurality of pieces of image data are arranged; and
generating pattern information that is information on a change pattern of each of the pieces of image data in accordance with the passage of time by acquiring a CNN model that is a trained convolutional neural network model and inputting input data that is based on the composite image data to the acquired CNN model, the pattern information indicating whether flicker occurs in an image of the image data.

9. The image recognition method according to claim 8, wherein
the generating composite image data comprises updating the composite image data by adding, every time the image acquisition unit acquires a piece of image data, the acquired image data to the composite image data, and
the generating pattern information comprises generating the pattern information every time the composite image data is updated.

10. The image recognition method according to claim 9, further comprising generating the CNN model, wherein
the generating the CNN model comprises generating the CNN model by acquiring learning purpose composite image data in which a plurality of pieces of learning purpose image data are arranged, and assigning a label to the learning purpose composite image data, wherein a change pattern of each of the pieces of learning purpose image data in accordance with a passage of time is known.

11. The image recognition method according to claim 10, wherein the generating the CNN model comprises setting a plurality of different types to the labels.

12. The image recognition method according to claim 11, wherein the generating the CNN model comprises setting the label for each image capturing condition of the learning purpose image data.

13. The image recognition method according to claim 12, wherein the generating the CNN model comprises setting the label for each combination of a shutter speed and a frame rate that are used when the learning purpose image data is captured.

14. A non-transitory computer-readable recording medium containing a computer program, the computer program causing a computer to execute:
acquiring a plurality of pieces of image data captured in accordance with a passage of time;
generating composite image data in which the plurality of pieces of image data are arranged; and
generating pattern information that is information on a change pattern of each of the pieces of image data in accordance with the passage of time by acquiring a CNN model that is a trained convolutional neural network model and inputting input data that is based on the composite image data to the acquired CNN model, the pattern information indicating whether flicker occurs in an image of the image data.

15. The non-transitory computer-readable recording medium according to claim 14, wherein
the generating composite image data comprises updating the composite image data by adding, every time the image acquisition unit acquires a piece of image data, the acquired image data to the composite image data, and the generating pattern information comprises generating the pattern information every time the composite image data is updated.

16. The non-transitory computer-readable recording medium according to claim 15, wherein
the computer program causes a computer to further execute generating the CNN model, and
the generating the CNN model comprises generating the CNN model by acquiring learning purpose composite image data in which a plurality of pieces of learning purpose image data are arranged, and assigning a label to the learning purpose composite image data, wherein a change pattern of each of the pieces of learning purpose image data in accordance with a passage of time is known.

17. The non-transitory computer-readable recording medium according to claim 16, wherein the generating the CNN model comprises setting a plurality of different types to the labels.

18. The non-transitory computer-readable recording medium according to claim 17, wherein the generating the CNN model comprises setting the label for each image capturing condition of the learning purpose image data.

19. The non-transitory computer-readable recording medium according to claim 18, wherein the generating the CNN model comprises setting the label for each combination of a shutter speed and a frame rate that are used when the learning purpose image data is captured.

* * * * *